ion.

3,040,078
SOLUTIONS OF DIALKYLZINC IN N,N-DIALKYL-AMIDES AND A PROCESS FOR THEIR PREPARATION

Robert Joly, Montmorency, and Robert Bucourt, Villiers-Le-Bel, France, assignors to Roussel-UCLAF, Societe Anonyme, Paris, France, a corporation of France
No Drawing. Filed Feb. 26, 1960, Ser. No. 11,155
Claims priority, application France June 5, 1959
4 Claims. (Cl. 260—429.9)

The present invention relates to solutions of dialkylzinc in an N,N-dialkylamide and a process for their preparation.

More particularly, it relates to solutions of di-alkylzinc having the formula $R_1ZnR_1$, in an N,N-dialkylamide having the formula,

where $R_1$ and $R_2$ represent lower alkyl and $R_3$ is a member selected from the group consisting of hydrogen, methyl and ethyl. In view of economy and convenience, the invention most particularly relates to solutions of dimethylzinc in N,N-dimethylformamide.

It is known that dialkylzinc is a reagent which is difficult to handle. It spontaneously bursts into flame in the air. It has now been found that dialkylzinc in solution in an N,N-dialkylamide may be manipulated in the air without any danger.

It is an object of the invention to obtain stable solutions of dialkylzinc having the formula $R_1ZnR_1$, in an N,N-dialkylamide having the formula,

where $R_1$ and $R_2$ represent lower alkyl and $R_3$ is a member selected from the group consisting of hydrogen, methyl and ethyl.

It is a further object of the invention to develop a process of preparing said solutions of dialkylzinc in an N,N-dialkylamide.

Another object of the invention is the development of an improved process for the condensation of ethyl formate with o-hydroxypropiophenone to produce 3-methylchromone using said solutions of dialkylzinc in an N,N-dialkylamide as a condensation agent.

These and other objects of the invention will become more apparent as the description proceeds.

We have found that solutions of dialkylzinc having the formula, $R_1ZnR_1$, in an N,N-dialkylamide having the formula,

where $R_1$ and $R_2$ represent lower alkyl and $R_3$ is a member selected from the group consisting of hydrogen, methyl and ethyl, are stable in the presence of air and constitute reagents which are useful in organic synthesis and find application, for example, in the preparation of 3-methylchromone starting with o-hydroxypropiophenone and ethyl formate. They are also useful as alkylating agents.

The process for the preparation of these solutions of dialkylzinc consists essentially of heating a solution of an alkylzinc halide having the formula $R_1ZnX$, where $R_1$ has the meaning given above and X represents a halogen, in an N,N-dialkylamide having the formula,

where $R_2$ and $R_3$ have the meaning given above, under a vacuum and distilling off solution of dialkylzinc in an N,N-dialkylamide according to the reaction:

The alkylzinc halides useful in the process of our invention are, for example, methylzinc bromide, methylzinc chloride, methylzinc iodide, ethylzinc bromide, n-propylzinc bromide, isopropylzinc iodide, n-butylzinc bromide, isoamylzinc bromide, etc. For economy and convenience, we prefer to use methylzinc bromide. The other alkylzinc halides, of course, are required as starting materials to produce dialkylzinc solutions useful in general alkylation reactions.

The N,N-dialkylamides useful in the process of our invention are those having the formula

where $R_2$ and $R_3$ have the meaning given above, such as N,N-dimethylformamide, N,N-diethylformamide, N,N-dipropylformamide, N,N,-dimethylacetamide, N,N-dimethylpropionamide, N,N-diethylacetamide, etc. The most economical and preferable N,N-dialkylamide to use is, of course, N,N-dimethylformamide.

The alkylzinc halide is preferably prepared by reacting an alkyl halide with metallic zinc in the presence of the N,N-dialkylamide at a temperature between about 20° and 100° C. until the metallic zinc is consumed. Small amounts of the iodide of the alkyl being reacted may be added as a catalyst for the reaction.

The dialkylzinc distilling over with N,N-dialkylamide according to the process will vary in concentration depending on the relative boiling points of the two components. Any concentration of the solution of dialkylzinc in N,N-dialkylamide containing about 3 gram-mols per kilogram of dialkylzinc or less can be used in the various reactions. The upper limit of concentration depends on the solubility of the particular dialkylzinc. For purposes of condensing ethyl formate with o-hydroxypropiophenone to form 3-methylchromone, we prefer to use a concentrated solution.

The following examples, which are non-limiting, illustrate the invention. The temperatures are indicated in degrees centigrade.

EXAMPLE I

Preparation of a Methylzinc Bromide Solution 400 gm. of zinc (powder, leaflets or chips) are admixed with 300 cc. of N,N-dimethylformamide and 5 cc. of methyl iodide (as catalyst) and a slow stream of methyl bromide is introduced into this mixture. The temperature rises to 50–55° C. within 15 minutes. The reaction proceeds in a fairly vigorous manner and the reaction mixture is cooled with an ice-water bath. After a few minutes the flow of methyl bromide is accelerated and 700 cc. of dimethylformamide are introduced in the course of ½ hour, all the while maintaining the temperature at 45–50° C.

The introduction of methyl bromide is continued while maintaining the temperature at 45–50° C. until the zinc completely disappears, which requires approximately three hours. Toward the end of the operation, the reaction is no longer sufficiently exothermic and the reaction mixture is heated in order to maintain the temperature constant. The methylzinc bromide solution titrates at 2.8 to 2.9 gram-mols per kilogram of solution.

EXAMPLE II

Preparation of a Dimethylzinc Solution

The entire solution obtained according to Example I is placed in a conventional distillation apparatus. The solution is then distilled under vacuum of 17 mm. Hg. The slight excess of methylbromide present in the reaction mixture is eliminated and a mixture of dimethylformamide and dimethylzinc is distilled off. The fractions which distill over up to 60–63° C. and then from 60–63° C. to about 70° C. are collected separately. The first fraction, which is a cloudy, colorless solution weighs 770 to 775 gm. and contains from 3 to 3.2 gram-mols of dimethylzinc per kilogram of solution. The second fraction weighs 260 to 265 gm. and contains 1.2 to 1.4 gram-mols of dimethylzinc per kilogram. The total yield based on metallic zinc is 87–93%.

Dimethylzinc may be prepared in analogous fashion starting from methylzinc iodide or methylzinc chloride in N,N-dimethylformamide.

EXAMPLE III

Preparation of a Diethylzinc Solution

A solution of ethylzinc bromide in N,N-dimethylacetamide containing 3 gram-mols of ethylzinc bromide per kilogram is heated under a vacuum of 17 mm. Hg in a distilling apparatus. After elimination of a small fraction of a low boiling material, approximately two-thirds of the solution is distilled off and collected. The distillate is a solution of diethylzinc in N,N-dimethylacetamide.

EXAMPLE IV

Preparation of 3-Methylchromone With the Aid of a Dimethylzinc Solution (a) *With preliminary action of dimethylzinc upon o-hydroxypropiophenone.*—19.45 gm. of o-hydroxypropiophenone are added dropwise to 107 gm. of a solution of dimethylzinc in N,N-dimethylformamide containing 3 gram-mols of dimethylzinc per kilogram, while agitating and cooling the mixture. During the introduction of the o-hydroxypropiophenone, 3.450 liters of methane are evolved, i.e., one mol per mol of o-hydroxypropiophenone. Thereafter, the reaction mixture is heated at 53–55° C. until the evolution of methane ceases, which takes approximately 2 hours. The reaction mixture is cooled to 10° C. and then 24 gm. of ethyl formate are added all at once. A slow exothermic reaction is produced, accompanied by a slight evolution of gas. The agitation is stopped and the clear yellow solution is allowed to stand for a few hours while cooling it on an ice-water bath. Thereafter, the solution is allowed to stand at room temperature for 7 days. The reaction solution turns reddish orange, a crystallization appears and finally spreads through the entire mass.

The excess zinc compound is decomposed by adding 41 cc. of acetic acid over a period of one hour, accompanied by agitation and cooling. 600 cc. of water are added and the resulting mixture is extracted several times with ethyl acetate. The extract solutions are combined and washed successively with water, with a saturated solution of sodium bicarbonate and again with water and dried over sodium sulfate. The ethyl acetate is evaporated. The residue readily crystallizes at 20° C. By distillation in a vacuum, 17.7 gm. (which is 85.5% of theory) of pure 3-methylchromone are obtained which passes over at 150°–152° C. under a pressure of 17 mm. of mercury. This compound has a melting point of 71°–72° C.

(b) *By direct action of dimethylzinc upon the reaction mixture.*—24.6 gm. of ethyl formate are added slowly and while agitating to 110.5 gm. of a solution of dimethylzinc (3 gram-mols per kilogram) in N,N-dimethylformamide. Thereafter, 19.8 gm. of o-hydroxypropiophenone are introduced over a period of ½ hour. The resulting mixture is heated for two and a half hours at about 50° C. until the evolution of gas ceases. It is then cooled to 20° C. and the excess of zinc compound is decomposed by the addition of 42 cc. of acetic acid while cooling. The mixture is diluted with water, extracted with ethyl acetate and crystallized as previously described. The compound is distilled in a vacuum and the fraction boiling at 150°–151° C. is collected. Pure 3-methylchromone is thus obtained, having a melting point of 71°–72° C., in a yield of 17.4 gm., which is 82.5% of theory.

The preceding examples are illustrative of the invention. It is to be understood, however, that various changes and modifications can be made without departing from the spirit of the invention or the scope of the appended claims.

We claim:
1. As an industrial product, a stable solution of dialkylzinc having the formula, $R_1ZnR_1$, in an N,N-dialkylamide having the formula,

where $R_1$ and $R_2$ represent lower alkyl and $R_3$ is a member selected from the group consisting of hydrogen, methyl and ethyl.

2. As an industrial product, a stable solution of dimethylzinc in N,N-dimethylformamide.

3. The process of preparing a stable solution of dialkylzinc having the formula $R_1ZnR_1$, in an N,N-dialkylamide having the formula,

where $R_1$ and $R_2$ represent lower alkyl and $R_3$ is a member selected from the group consisting of hydrogen, methyl and ethyl, which comprises the steps of heating a solution of an alkylzinc halide having the formula, $R_1ZnX$, where $R_1$ has the meaning above and X represents a halogen in said N,N-dialkylamide under vacuum, distilling off and condensing said solution of dialkylzinc in an N,N-dialkylamide.

4. The process of preparing a stable solution of dimethylzinc in N,N-dimethylformamide which comprises the steps of heating a solution of methylzinc bromide in N,N-dimethylformamide, distilling off and condensing said solution of dimethylzinc in N,N-dimethylformamide.

References Cited in the file of this patent

UNITED STATES PATENTS

| | | |
|---|---|---|
| 2,769,015 | Mentzer | Oct. 30, 1956 |
| 2,792,407 | Heininger | May 14, 1957 |
| 2,849,468 | Cardinal | Aug. 26, 1958 |
| 2,942,017 | Petree | June 21, 1960 |

OTHER REFERENCES

Rochow et al.: "The Chemistry of Organometallic Compounds (1957), pages 100–105.